United States Patent
Sallaway et al.

(10) Patent No.: US 6,980,644 B1
(45) Date of Patent: Dec. 27, 2005

(54) SYSTEM AND METHOD FOR ADAPTING AN ANALOG ECHO CANCELLER IN A TRANSCEIVER FRONT END

(75) Inventors: Peter J. Sallaway, San Diego, CA (US); Thulasinath G. Manickam, San Diego, CA (US); Sreen Raghavan, La Jolla, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/570,078

(22) Filed: May 12, 2000

(51) Int. Cl.[7] .................. H04M 1/00; H04M 9/00; H04M 9/08

(52) U.S. Cl. .................. 379/391; 379/392; 379/406.01

(58) Field of Search .................. 379/391, 392

(56) References Cited

Primary Examiner—Forester W. Isen
Assistant Examiner—Ramnandan Singh

(57) ABSTRACT

There is disclosed an echo canceller circuit for use in a full duplex transceiver of the type comprising a line driver capable of sending analog transmit signals through a cable and comprising a line receiver capable of receiving analog receive signals from the cable. An echo canceller impedance model circuit is coupled to an output of the line driver and is coupled to an input of the line receiver. The echo canceller impedance model circuit generates an echo canceller current that is equal in magnitude and opposite in phase to a current that represents signal echoes that are present in the analog receive signals. The echo canceller impedance model circuit has a variable impedance for generating the echo canceller current. The variable impedance has at least one variable resistor and at least one variable capacitor. The values of resistance and capacitance in the echo canceller impedance model circuit are varied in response to control signals from a echo canceller control circuit to compensate for and cancel signal echoes.

20 Claims, 9 Drawing Sheets

SYSTEM AND METHOD FOR ADAPTING AN ANALOG ECHO CANCELLER IN A TRANSCEIVER FRONT END

CROSS-REFERENCE TO RELATED APPLICATIONS

The present invention is related to those disclosed in the following U.S. patent applications:
1. Ser. No. 09/570,076, filed concurrently herewith, entitled "FULL DUPLEX GIGABIT-RATE TRANSCEIVER FRONT-END AND METHOD OF OPERATION;"
2. Ser. No. 09/569,957, filed concurrently herewith, entitled "SYSTEM AND METHOD FOR CANCELLING SIGNAL ECHOES IN A FULL-DUPLEX TRANSCEIVER FRONT END;"
3. Ser. No. 09/570,331, filed concurrently herewith, entitled "SYSTEM AND METHOD FOR MIXED MODE EQUALIZATION OF SIGNALS;"
4. Ser. No. 09/570,077, filed concurrently herewith, entitled "DIGITALLY CONTROLLED AUTOMATIC GAIN CONTROL SYSTEM FOR USE IN AN ANALOG FRONT-END OF A RECEIVER;"
5. Ser. No. 09/569,828, filed concurrently herewith, entitled "SYSTEM AND METHOD FOR CORRECTING OFFSETS IN AN ANALOG RECEIVER FRONT END;" and
6. Ser. No. 09/569,518, filed concurrently herewith, entitled "RECEIVER ARCHITECTURE USING MIXED ANALOG AND DIGITAL SIGNAL PROCESSING AND METHOD OF OPERATION."

The above applications are commonly assigned to the assignee of the present invention. The disclosures of these related patent applications are hereby incorporated by reference for all purposes as if fully set forth herein.

TECHNICAL FIELD OF THE INVENTION

The present invention is generally directed to transceivers for sending and receiving analog signals and, more specifically, to a system and method for adapting an analog echo canceller in a transceiver front end.

BACKGROUND OF THE INVENTION

In a full duplex transceiver analog signals are simultaneously transmitted and received on a cable. For example, Gigabit Ethernet transceivers simultaneously transmit and receive analog signals over twisted pair category 5 copper cable. In full duplex operation the receive signal contains both the receive signal from the remote end transmitter and the transmit signal from the local transmitter. The signal from the local transmitter is referred to as echo. In order to correctly recover the data from the remote end transmitter in the receive signal, it is necessary to cancel the echo in the receive signal. This task may be accomplished with an echo canceller circuit.

An echo canceller circuit works on the principle of subtracting an estimate of the transmit signal from the full duplex signal. The full duplex signal that reaches the receiver comprises the receive signal plus echo signals from the transmit signal. An echo canceller circuit provides a copy of the transmit signal to the receiver portion of the transceiver so that the receiver can subtract the transmit signal from the full duplex signal.

Analog echo cancellation is very important. Analog echo cancellation provides a large amount of echo cancellation. This reduces the complexity and the size of any digital echo canceller that may be used to obtain additional echo cancellation after the analog signals are converted to digital signals. More importantly, analog echo cancellation produces a high signal to echo ratio at the input of an analog to digital converter (ADC). This means that the receive signal can be boosted before entering the ADC without saturating the ADC. This additional boost leads to less quantization noise and a higher signal to noise ratio (SNR). In this manner, good analog echo cancellation can significantly improve the bit error rate and cable length performance of the transceiver.

The invention will be described as used in an integrated circuit (IC). However, the invention is not limited to use in an integrated circuit but may be used in other types of electronic circuits.

The transmit signal that is actually placed on the cable by the local transmitter of the transceiver (and therefore the echo) depends upon the impedance that is presented to the integrated circuit (IC) that contains the transmitter of the transceiver. The impedance that is presented to the IC is made up of a number of elements including the impedance of the cable, the z11 impedance of the transformer that couples the cable to the transceiver front end, the impedance of the IC on-board traces, and the impedance of the IC input/output (I/O) structures such electrostatic discharge protectors, I/O cells, and the like. The effective impedance that is presented to the IC will vary depending upon the variations within these components and the manufacturing tolerances within these components.

There is therefore a need in the art for an improved echo canceller circuit that is capable of taking into account the actual external impedance that is encountered by a transmit signal in a full duplex transceiver.

There is also a need in the art for an improved echo canceller that can adapt to different cable lengths.

There is also a need in the art for an improved echo canceller that can adapt to impedance changes in external components due to changing conditions such as ambient temperature.

There is also a need in the art for an improved echo canceller that has multiple degrees of freedom for adapting to changes caused by manufacturing processes.

SUMMARY OF THE INVENTION

The echo canceller circuit of the present invention has the ability to measure and replicate the effective external impedance that is presented to the transmit signal of a transceiver. Therefore, the echo canceller circuit of the present invention is able to more perfectly estimate the transmit signal that is actually transmitted by the transceiver.

Because the echo canceller circuit of the present invention can replicate the effective external impedance (and estimate the actual transmit signal), it can cancel signal echoes caused by a transmit signal with greater precision than that of prior art echo canceller circuits.

The echo canceller circuit of the present invention is designed to be used in a full duplex transceiver of the type comprising a line driver capable of sending analog transmit signals through a cable and comprising a line receiver capable of receiving analog receive signals from the cable. An echo canceller impedance model circuit is coupled to an output of the line driver and is coupled to an input of the line receiver.

The echo canceller impedance model circuit generates an echo canceller current that is equal in magnitude and opposite in phase to a current that represents the signal echoes that are present in the full duplex signal. The echo canceller impedance model circuit has a variable impedance for generating said echo canceller current. The variable impedance has variable resistors and variable capacitors. The values of resistance and capacitance in the echo canceller impedance model circuit are varied in response to control signals from an echo canceller control circuit to compensate for and cancel signal echoes. In some types of full duplex transceivers, the echo canceller circuit of the present invention is capable of providing from eighteen (18) to twenty (20) decibels (dB) of echo rejection.

It is a primary object of the present invention to provide an echo canceller circuit that measures and replicates the effective external impedance that is presented to the transmit signal of a transceiver.

It is another object of the present invention to provide an improved echo canceller circuit that compensates for the variations and manufacturing tolerances of various components within the transceiver that affect the effective external impedance that is presented to the transmit signal of a transceiver.

It is another object of the present invention to provide a system and method for cancelling signal echoes in a full-duplex transceiver front end.

It is another object of the present invention to provide an improved echo canceller circuit that varies the value of at least one variable resistor in response to an estimate of residual uncancelled echo to generate an echo canceller signal.

It is another object of the present invention to provide an improved echo canceller circuit for cancelling signal echoes in a full-duplex transceiver front end.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OR THE INVENTION

FIGS. 1 through 10, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged analog echo canceller in a transceiver front end.

Figure 1A:
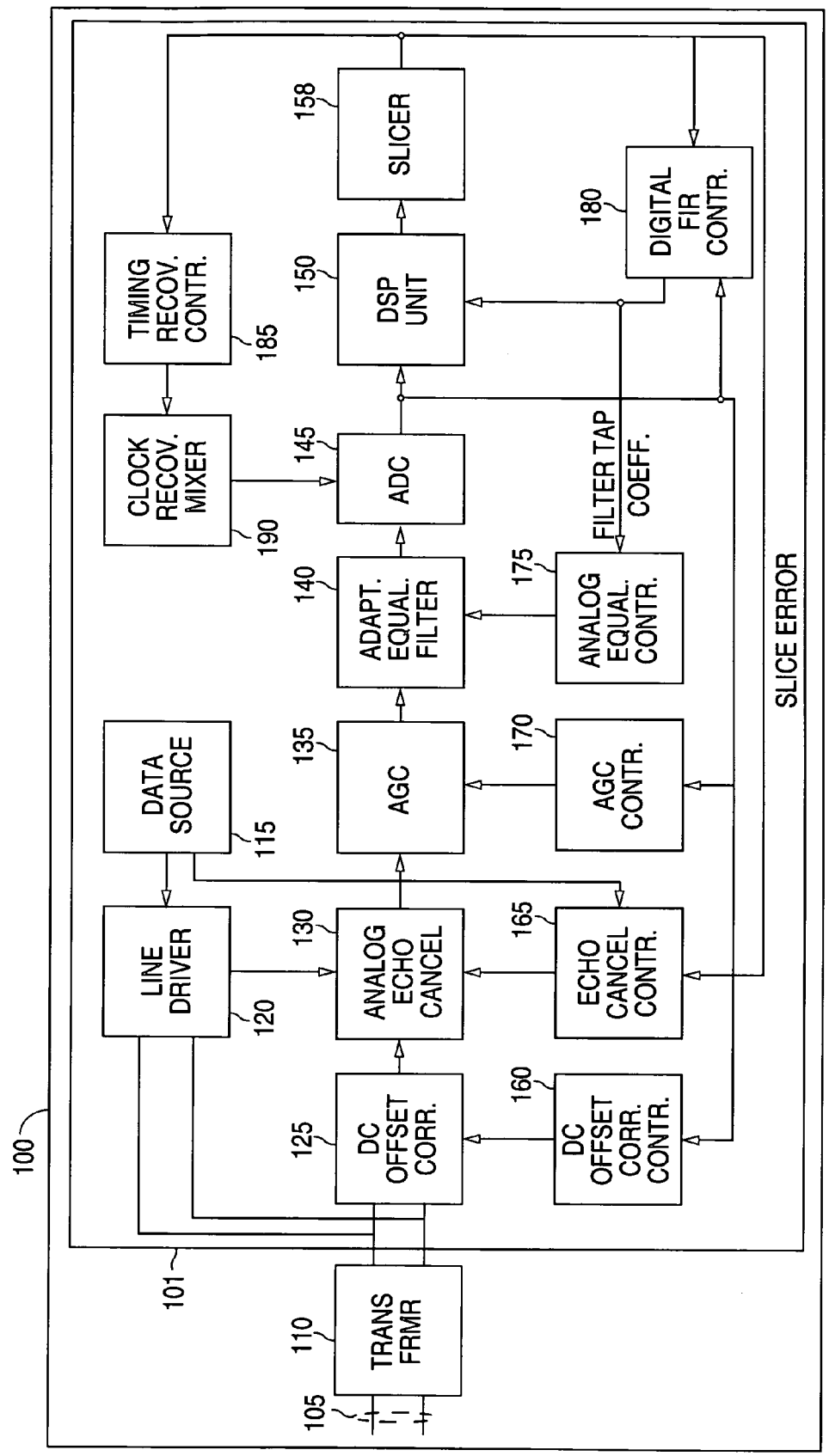
FIG. 1A illustrates a block diagram of a front end of an exemplary full duplex transceiver showing the location within the full duplex transceiver of an analog echo canceller according to one embodiment of the present invention.

FIG. 1A illustrates a block diagram of the front end of an exemplary full duplex transceiver 100. Full duplex transceiver 100 simultaneously transmits and receives analog signals through cable 105. Cable 105 may be a copper twisted pair cable. Cable 105 is coupled to transformer 110.

Transformer 110 receives analog data signals from data source 115 through line driver 120 and transfers the analog data signals to cable 105 for transmission. Transformer 110 also receives analog data signals from cable 105 and transfers them to DC offset correction circuit 125.

DC offset correction circuit 125 receives incoming analog data signals from transformer 110 and adjusts the incoming analog data signals by providing an offset signal that cancels the systematic offset that accrues during the operation of transceiver 100. DC offset correction circuit 125 then transfers the incoming analog data signals to analog echo canceller (AEC) 130.

The analog data signals that AEC 130 receives from DC offset correction circuit 125 contain echoes of the transmit signal that transformer 110 transfers to cable 105 from line driver 120. The task of AEC 130 is to remove the echoes of the transmit signal from the analog data signal that AEC 130 receives from DC offset correction circuit 125. In an alternate embodiment of full duplex transceiver 100, DC offset correction circuit 125 is not present and AEC 130 removes the echoes of the transmit signal from the analog data signal that AEC 130 receives from transformer 110.

To enable AEC 130 to remove the echoes of the transmit signal, line driver circuit 120 transfers a copy of the transmit signal to AEC 130. Line driver circuit 120 transfers the copy of the transmit signal to AEC 130 at the same time that line driver circuit 120 transfers the transmit signal to transformer 110. As will be explained more fully below, AEC 130 utilizes information concerning the transmit signal to cancel out the echoes of the transmit signal from the analog data signals that AEC 130 receives.

After AEC 130 cancels out echoes of the transmit signal, AEC 130 transfers the analog data signals to automatic gain control (AGC) circuit 135. After AGC circuit 135 automatically adjusts the gain of the analog data signals, AGC circuit 135 transfers the analog data signals to adaptive equalization filter 140.

Adaptive equalization filter 140 is used to provide signal equalization. Adaptive equalization filter 140 provides a high frequency boost to complement the analog data signal loss in cable 105. The amount of the high frequency boost provided by adaptive equalization filter 140 is adapted to the length of cable 105. Adaptive equalization filter 140 then transfers the filtered analog data signals to analog-to-digital converter (ADC) 145 where the filtered analog data signals are converted to digital signals.

Figure 1B:
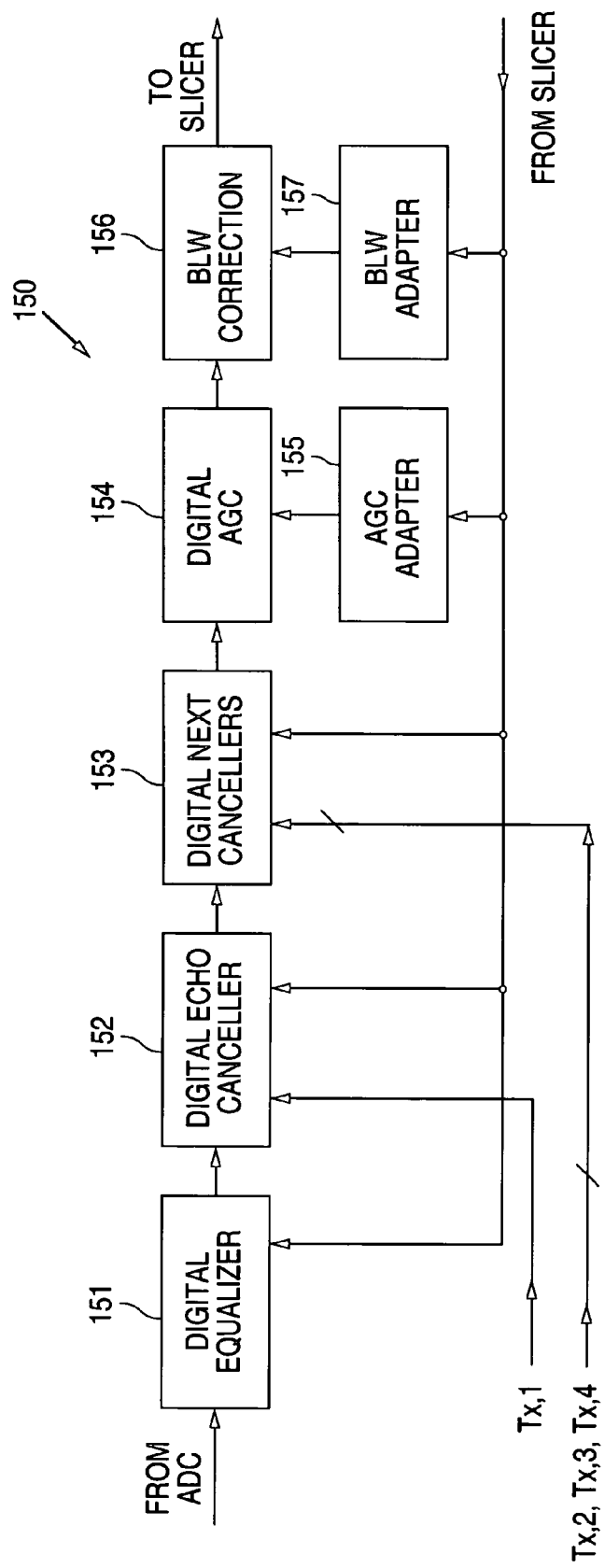
FIG. 1B illustrates a block diagram of a digital signal processing unit of the exemplary full duplex transceiver.

Digital signals from ADC 145 are transferred to a digital signal processing unit (DSP) 150. As shown in FIG. 1B, digital signal processing unit 150 comprises digital equalizer 151, digital echo canceller 152, digital near end cross talk (NEXT) cancellers 153, digital automatic gain control (AGC) circuit 154, AGC adapter 155, base line wander (BLW) correction circuit 156, and BLW adapter 157. The output of BLW correction circuit 156 (representing the output of digital signal processing unit 150) is coupled to data slicer circuit 158 (shown in FIG. 1A).

Data slicer circuit 158 determines error in the digital signals and transfers the error to analog echo canceller control circuit 165. Analog echo canceller control circuit 165 sends control signals to AEC 130. In response to these control signals, AEC 130 automatically adjusts the values of certain circuit components to cause signal echoes to be cancelled.

Other control circuits in full duplex transceiver 100 include DC offset correction control circuit 160, AGC control circuit 170, and analog equalization control circuit 175. Digital finite impulse response (FIR) control circuit 180 provides FIR tap coefficients to digital signal processing unit 150 and to analog equalization control circuit 175. Lastly, timing recovery control circuit 185 receives error signals from slicer circuit 158 to provide frequency adjustments to clock recovery mixer 190 to adjust the phase and frequency of the clock of ADC 145.

Figure 2:
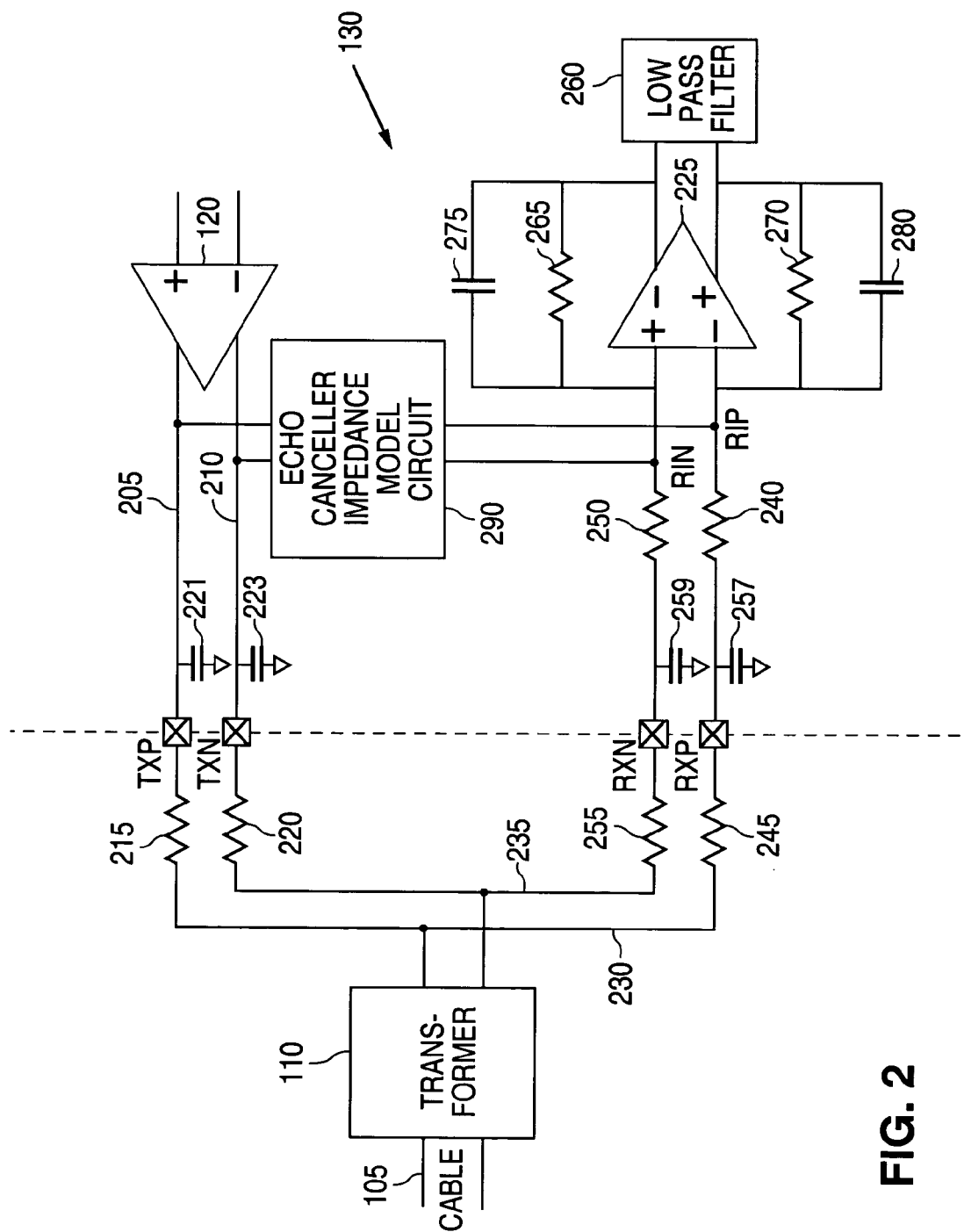
FIG. 2 illustrates how the analog echo canceller according to one embodiment of the present invention is coupled to the transmit path and to the receive path of the full duplex transceiver.

FIG. 2 illustrates a more detailed view of AEC 130 of the present invention showing how AEC 130 is coupled to the transmit path and the receive path of full duplex transceiver 100. DC offset correction circuit 125 is not present in the embodiment shown in FIG. 2. Line driver 120 is coupled to transformer 110 by first signal line 205 and by second signal line 210. First signal line 205 connects the positive output terminal of line driver 120 to transformer 110 through off-chip termination point TXP and through resistor 215. Resistor 215 has a value of resistance equal to one half the resistance of cable 105. Because the resistance of cable 105 is typically one hundred ohms (100 Ω) the typical value of resistor 215 is fifty ohms (50 Ω). Similarly, second signal line 210 connects the negative output terminal of line driver 120 to transformer 110 through off-chip termination point TXN and through resistor 220. Resistor 220 also has a value equal to one half the resistance of cable 105. Because the resistance of cable 105 is typically one hundred ohms (100 Ω) the typical value of resistor 220 is fifty ohms (50 Ω). Line driver 120 transfers the transmit signal to transformer 110 via first signal line 205 and second signal line 210.

Off-chip termination point TXP and off-chip termination point TXN mark the boundary between the integrated circuit (IC) chip and the off-chip circuitry of AEC 130. The chip boundary is represented in FIG. 2 by a dotted line drawn through the off-chip termination points TXP and TXN. Circuit elements to the right of the dotted line are on the IC chip. Circuit elements that are to the left of the dotted line are not on the IC chip. First signal line 205 passes through the chip boundary at off-chip termination point TXP. Second signal line 210 passes through the chip boundary at off-chip termination point TXN.

Capacitors 221 and 223 are provided on the IC chip for electrostatic discharge (esd) protection. Capacitors 221 and 223 have a value of capacitance of Cesd (with a typical value of ten picofarads (10 pF)). As shown in FIG. 2, capacitor 221 is coupled in between first signal line 205 on the IC chip just to the right of off-chip termination point TXP and ground. Capacitor 223 is coupled between second signal line 210 on the IC chip just to the right of off-chip termination point TXN and ground.

AEC 130 comprises line receiver 225 that is coupled to transformer 110 by third signal line 230 and by fourth signal line 235. Third signal line 230 connects the negative input terminal of line receiver 225 to transformer 110 through resistor 240 that has a value of resistance R1 (with a typical value of two thousand ohms (2000 Ω)) and through off-chip termination point RXP and through resistor 245 that has a value of resistance of Rs (with a typical value of one hundred fifty ohms (150 Ω)). Third signal line 230 is coupled to first signal line 205 at a common input to transformer 110.

Fourth signal line 235 connects the positive terminal of line receiver 225 to transformer 110 through resistor 250 that has a value of resistance R1 (with a typical value of two thousand ohms (2000 Ω)) and through off-chip termination point RXN and through resistor 255 that has a value of resistance Rs (with a typical value of one hundred fifty ohms (150 Ω)). Fourth signal line 235 is coupled to second signal line 210 at a common input to transformer 110.

Off-chip termination point RXN and off-chip termination point RXP mark the boundary between the IC chip and the off-chip circuitry of AEC 130. The chip boundary is represented in FIG. 2 by a dotted line drawn through the off-chip termination points TXP and TXN and continued through the off-chip termination points RXN and RXP. As previously mentioned, circuit elements to the right of the dotted line are on the IC chip and circuit elements that are to the left of the dotted line are not on the IC chip.

Third signal line 230 passes through the chip boundary at off-chip termination point RXP. Fourth signal line 235 passes through the chip boundary at off-chip termination point RXN.

Capacitors 257 and 259 are provided on the IC chip for electrostatic discharge (esd) protection. Capacitors 257 and 259 have a value of capacitance of Cesd (with a typical value of ten picofarads (10 pF)). As shown in FIG. 2, capacitor 257 is coupled between third signal line 230 on the IC chip just to the right of off-chip termination point RXP and ground. Capacitor 259 is coupled between fourth signal line 235 on the IC chip just to the right of off-chip termination point RXN and ground.

The positive and negative output terminals of line receiver 225 are coupled to low pass filter 260. Line receiver 225 transfers the signals that it receives to low pass filter 260. As will be more fully described, low pass filter 260 attenuates high frequency echoes that remain after the signal has passed through AEC 130.

The positive input terminal of line receiver 225 and the negative output terminal of line receiver 225 are coupled to resistor 265. Resistor 265 has a value of resistance of R2 (with a typical value of two thousand ohms (2000 Ω)). The negative input terminal of line receiver 225 and the positive output terminal of line receiver 225 are coupled to resistor 270. Resistor 270 has a value of resistance of R2 (with a typical value of two thousand ohms (2000 Ω)). An optional capacitor 275 may be placed in parallel with resistor 265 and an optional capacitor 280 may be placed in parallel with resistor 270.

AEC 130 also comprises echo canceller impedance model circuit 290 referred to as model circuit 290. The purpose of model circuit 290 is to automatically provide echo cancelling signals that will compensate for and cancel signal echoes that are due to transformer magnetics, cable impedance, circuit board parasitic signals, and other similar causes.

Figure 3:
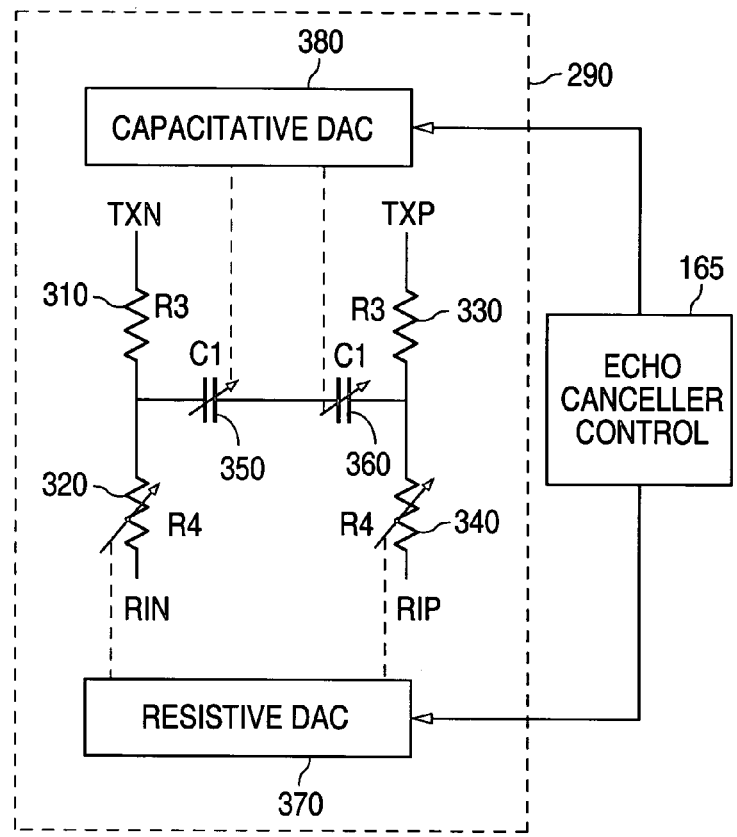
FIG. 3 illustrates a circuit diagram showing the circuitry of an echo canceller impedance model circuit according to one embodiment of the present invention.

As shown in FIG. 2, model circuit 290 is coupled to (a) first signal line 205 at TXP, and to (b) second signal line 210 at TXN, and to (c) third signal line 230 at the negative input of line receiver 225 (at a point identified as RIP), and to (d) fourth signal line 235 at the positive input of line receiver 225 (at a point identified as RIN). The circuitry of model circuit 290 is shown in FIG. 3.

A first branch of model circuit 290 comprises resistor 310. Resistor 310 has a value of resistance of R3 (with a typical value of five hundred ohms (500 Ω)) coupled in series with variable resistor 320. Variable resistor 320 has a value of resistance of R4 (with a typical central value of three thousand eight hundred fifty ohms (3850 Ω)). Resistor 310 is coupled to second signal line 210 at TXN and variable resistor 320 is coupled to fourth signal line 235 at RIN.

A second branch of model circuit 290 comprises resistor 330. Resistor 330 has a value of resistance of R3 (with a typical value of five hundred ohms (500 Ω)) coupled in series with variable resistor 340. Variable resistor 340 has a value of resistance of R4 (with a typical central value of three thousand eight hundred fifty ohms (3850 Ω)). Resistor 330 is coupled to first signal line 205 at TXP and variable resistor 340 is coupled to third signal line 230 at RIP.

A third branch of model circuit 290 comprises variable capacitor 350 coupled in series with variable capacitor 360. Variable capacitor 350 has a value of capacitance of C1 (with a typical central value of 3.3 picofarads). Variable capacitor 360 has a value of capacitance of C1 (with a typical central value of 3.3 picofarads). Variable capacitor 350 is coupled to the first branch of model circuit 290 between resistor 310 and variable resistor 320. Variable capacitor 360 is coupled to the second branch of model circuit 290 between resistor 330 and variable resistor 340.

Resistive digital-to-analog converter (DAC) 370 is coupled to the tuning mechanism of variable resistors, 320 and 340. The tuning mechanism of the variable resistors, 320 and 340, is schematically represented in FIG. 3 by arrows on the resistors. Resistive DAC 370 is coupled to the tuning mechanism of variable resistors, 320 and 340, in parallel (i.e., in a "ganged" connection). This means that tuning one of the variable resistors immediately causes the other variable resistor to be tuned by the same amount. The parallel or "ganged" connection is schematically represented in FIG. 3 by parallel dotted lines. Resistive DAC 370 receives control signal for the variable resistors, 320 and 340, from analog echo canceller control circuit 165.

Similarly, capacitive digital-to-analog converter (DAC) 380 is coupled to the tuning mechanism of variable capacitors, 350 and 360. The tuning mechanism of the variable capacitors, 350 and 360, is schematically represented in FIG. 3 by arrows on the capacitors. Capacitive DAC 380 is coupled to the tuning mechanism of variable capacitors, 350 and 360, in parallel (i.e., in a "ganged" connection). This means that tuning one of the variable capacitors immediately causes the other variable capacitor to be tuned by the same amount. The parallel or "ganged" connection is schematically represented in FIG. 3 by parallel dotted lines. capacitive DAC 380 receives control signal for the variable capacitors, 350 and 360, from analog echo canceller control circuit 165.

Figure 4:
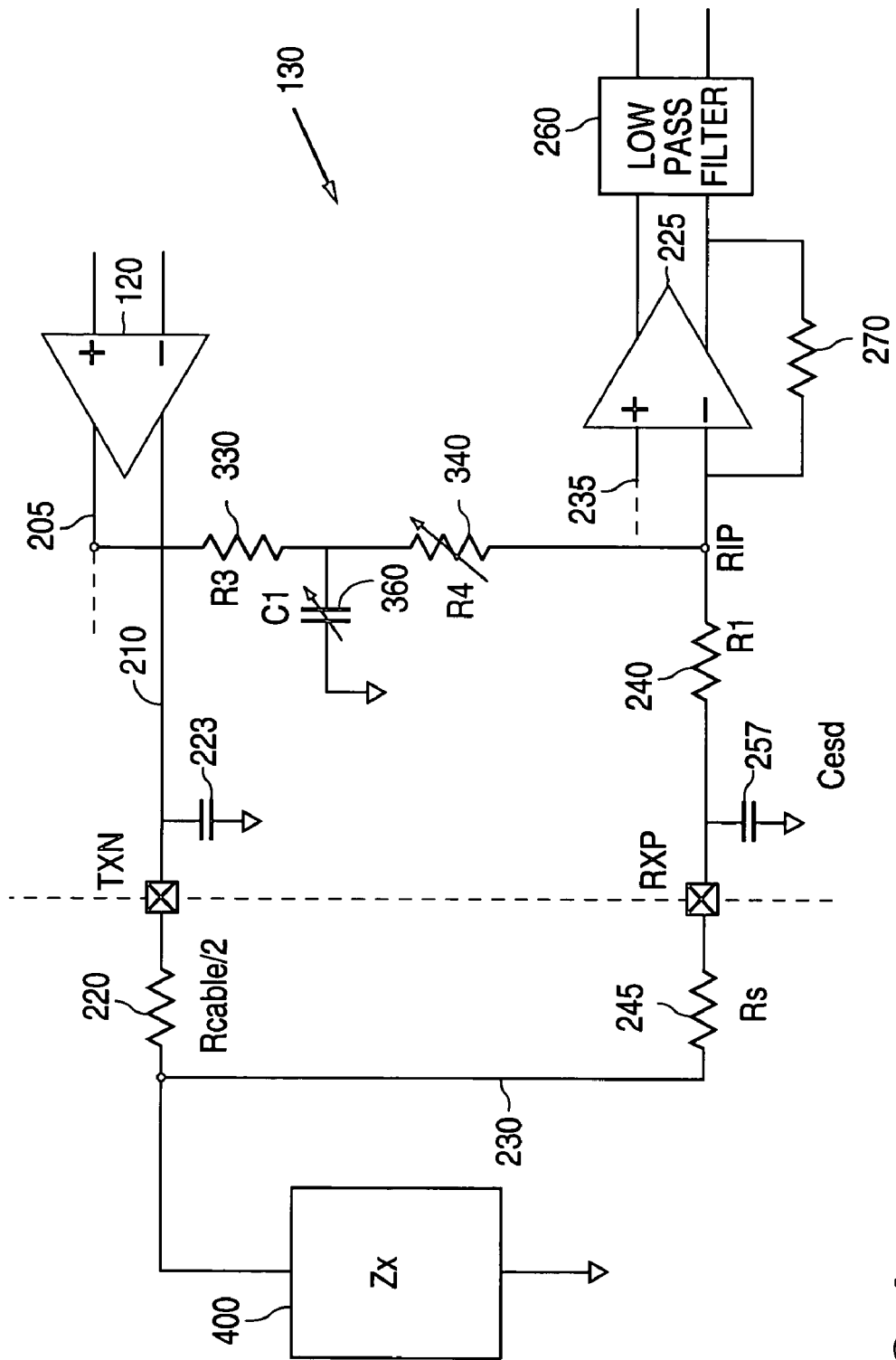
FIG. 4 illustrates a more detailed view of a portion of the analog echo canceller according to one embodiment of the present invention showing the connection of one branch of the echo canceller impedance model circuit to the signal lines of the full duplex transceiver.

FIG. 4 illustrates a more detailed view of AEC 130. FIG. 4 illustrates the operation of the second branch of model circuit 290 that is connected between first signal line 205 and third signal line 230. The first branch of model circuit 290 that is connected between second signal line 210 and fourth signal line 235 operates in a similar manner. The small triangles that are shown connected to some of the circuit elements in FIG. 4 represent connections to low impedance nodes ("virtual" grounds).

The current that represents the echo signal is referred to as iECHO. The current iECHO passes through resistor 240 in third signal line 230 to the point identified as RIP. The current that represents the echo canceller signal is referred to as iECHOCANCEL. The current iECHOCANCEL passes through resistor 340 in the second branch of model circuit 290 to the point identified as RIP. The current iECHOCANCEL is equal to the current iECHO but is pi ($\pi$) radians (or 180°) out of phase with it. The current iECHOCANCEL cancels the current iECHO at the point RIP. The echo components in the receive signal are cancelled before the signal reaches the input of line receiver 225.

In order to calculate the magnitude of the currents, it is first necessary to obtain the impedance Zx of the combination of cable 105 and transformer 110. The impedance Zx of the combination of cable 105 and transformer 110 is represented in FIG. 4 by block 400. The impedance Zx of the combination of cable 105 and transformer 110 may be modeled with the equation:

$$Z_x = Z_0[(1+s/Z_1)/[(1+s/p_1)(1+s/p_2)]] \qquad (1)$$

where $Z_0$ equals one half the impedance of cable 105, $Z_1$ equals a zero of the transfer function of the combination of transformer 110 and cable 105, $p_1$ equals a first pole of the transfer function, $p_2$ equals a second pole of the transfer function, and s equals j (the imaginary unit that is equal to the square root of minus one) times $\omega_0$ (the frequency in radians).

Figure 5:
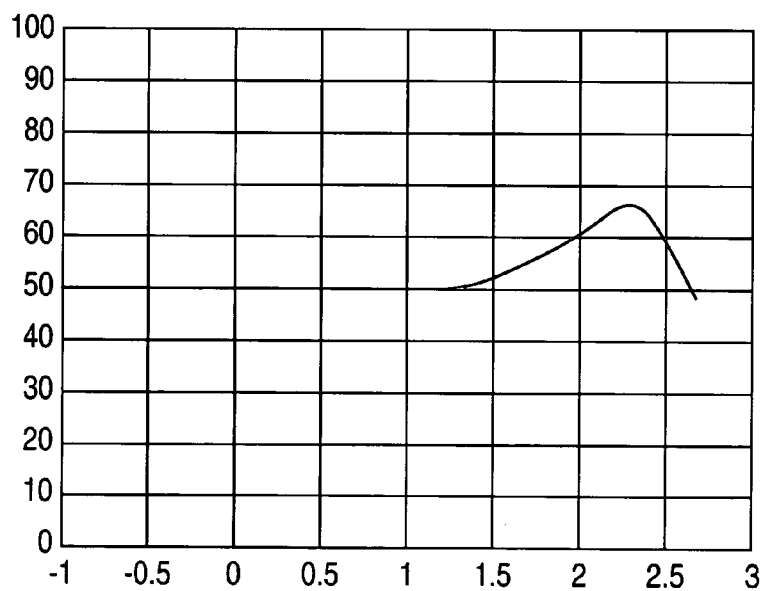
FIG. 5 is a graph that shows the values of the impedance of the combination of the cable and the transformer as a function of frequency.

As an illustrative example, FIG. 5 shows the values of impedance Zx as a function of frequency for the following values: $f_0$ equals the frequency, $Z_0$ equals 50 ohms, $Z_1$ equals $2\pi$ times 100 times $10^6$, $p_1$ equals $2\pi$ times 200 times $10^6$, $p_1$ equals $2\pi$ times 300 times $10^6$. In FIG. 5 the ordinate of the graph is in units of ohms and the value ranges from zero (0) ohms to one hundred (100) ohms. The abscissa of the graph is in units of $\log_{10}(f_0/10^6)$ and the value ranges from minus one (−1) to three (3). For $f_0$ equal to one Megahertz (1 MHz), the abscissa value is zero because $\log_{10}(1.0 \times 10^6/10^6)$ equals zero. Similarly, the abscissa value is equal to minus one (−1) for 100 kilohertz (100 kHz), and is equal to one (1) for ten Megahertz (10 MHz), and is equal to two (2) for one hundred Megahertz (100 MHz), and is equal to three (3) for one Gigahertz (1 Ghz). Therefore, the range of the values of the abscissa of the graph is from 100 kilohertz (100 kHz) to one Gigahertz (1 GHz). The graph in FIG. 5 shows that the impedance Zx of the combination of cable 105 and transformer 110 has a maximum at a frequency where $\log_{10}(f_0/10^6)$ approximately equals 2.3. This corresponds to a frequency of approximately two hundred Megahertz (200.0 MHz).

The impedance Zi of the circuit branch comprising resistor 245 with value Rs and capacitor 257 with value Cesd and resistor 240 with value R1 may be modeled with the equation:

$$Z_i = R_s + [R1/(1+sR1C_{esd})] \quad (2)$$

where Rs equals the value of resistor 245, R1 equals the value of resistor 240, Cesd equals the value of capacitor 257, and s equals (the imaginary unit that is equal to the square root of minus one) times $\omega_0$ (the frequency in radians).

The current iECHO that passes through the circuit branch comprising resistor 245 with value Rs and capacitor 257 with value Cesd and resistor 240 with value R1 may be modeled with the equation:

$$iECHO = (A)(B)[(Zi\|Zx)/((R_{cable}/2)+(Zi\|Zx))] \quad (3)$$

where $A = (1/(R1+R_s))$ and $B = (1/[1+sC_{esd}(R1R_s)/(R1+R_s)])$, and where Zi and Zx have the previously described values of impedance, and where the terms ($R_{CABLE}$)/2, R1, Rs, Cesd, and s have the previously described definitions. The term Zi∥Zx refers to the total impedance of the terms Zi and Zx in parallel. That is, Zi∥Zx equals the product of Zi and Zx divided by the sum of Zi and Zx.

The current iECHOCANCEL that passes through the circuit branch comprising resistor 330 with value R3 and variable capacitor 360 with value C1 and variable resistor 340 with value R4 may be modeled with the equation:

$$iECHOCANCEL = (1/(R3+R4))(1/[1+s(C1)(R3R4)/(R3+R4)]) \quad (4)$$

where the terms R3, R4, C1, and s have the previously described definitions. As previously described, variable capacitor C1 and variable resistor R4 are tuned to values that cause iECHOCANCEL to be equal to iECHO in magnitude but pi ($\pi$) radians (or 180°) out of phase.

Adaptation of R4 and C1 gives two degrees of freedom to attempt to match the impedance of the IC. The first degree of freedom is that of variable resistor R4. Because R4 is much greater than R3, the sum of R3 and R4 is approximately equal to R4 which causes the expression R3∥R4 to be approximately equal to R3. This means that varying the value of R4 will vary the gain of model circuit 290 but, for all practical purposes, will not affect the value of the time constant (R3∥R4) C1 of model circuit 290.

The second degree of freedom is that of variable capacitor C1. A change in the value of C1 proportionally affects the value of the time constant (R3∥R4) C1 but has virtually no impact on the value of flat gain. Therefore, the gain provided by model circuit 290 and the time constant of model circuit 290 can be controlled separately by adjusting the values of R4 and C1.

Figure 6:
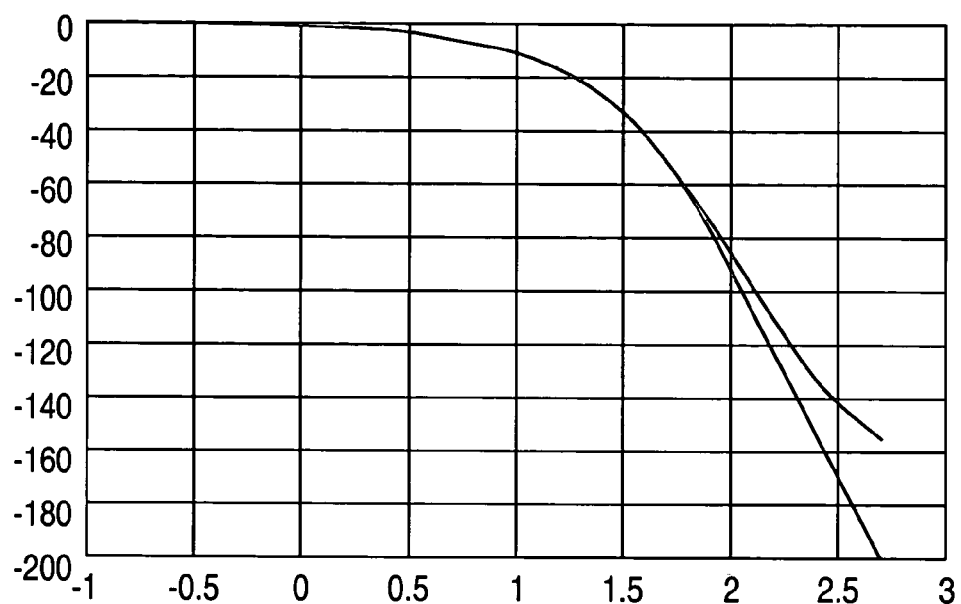
FIG. 6 is a graph that shows the values of the magnitude of the echo current and the values of magnitude of the echo canceller current as a function of frequency.

FIG. 6 shows the values of the magnitude of echo current iECHO and the values of magnitude of echo canceller current iECHOCANCEL as a function of frequency for the following values: $f_0$ equals the frequency, $R_{CABLE}$ equals one hundred ohms (100 $\Omega$), Rs equals one hundred fifty ohms (150 $\Omega$), R1 equals two thousand ohms (2000 $\Omega$), Cesd equals ten picofarads (10 pF), R3 equals five hundred ohms (500 $\Omega$), R4 equals three thousand eight hundred fifty (3850 $\Omega$) ohms, and C1 equals 3.3 picofarads (3.3 pF). The values of the impedances Zi and Zx are calculated as previously described.

In FIG. 6 the ordinate of the graph is in units of $20 \log_{10}$ (absolute value of current). That is, the ordinate is $20 \log_{10}$ (|iECHO|) or $20 \log_{10}$ (|iECHOCANCEL|). The ordinate values range from minus two hundred (−200) to zero (0). The abscissa of the graph is in units of $\log_{10}(f_0/10^6)$ and the value ranges from minus one (−1) to three (3) representing a frequency range of 100 kilohertz (100 kHz) to one Gigahertz (1 GHz). The graph in FIG. 6 shows that the echo current iECHO and the echo canceller current iECHOCANCEL have the same magnitude through a wide range of frequencies. The magnitudes of the two currents only begin to differ significantly when the frequency exceeds one hundred Megahertz (100 MHz) where $\log_{10}(f_0/10^6)$ equals two (2).

The amount of uncancelled echo that appears at the output of low pass filter 260 may be modeled with the equation:

$$\text{UNCANCELLED ECHO} = (iECHO - iECHOCANCEL)(R2)(1/(1+s/fp)) \quad (5)$$

where R2 represents resistor 270 that is coupled in parallel with line receiver 225, and s equals j (the imaginary unit that is equal to the square root of minus one) times $\omega_0$ (the frequency in radians). The term fp represents the pole of low pass filter 260.

Figure 7:
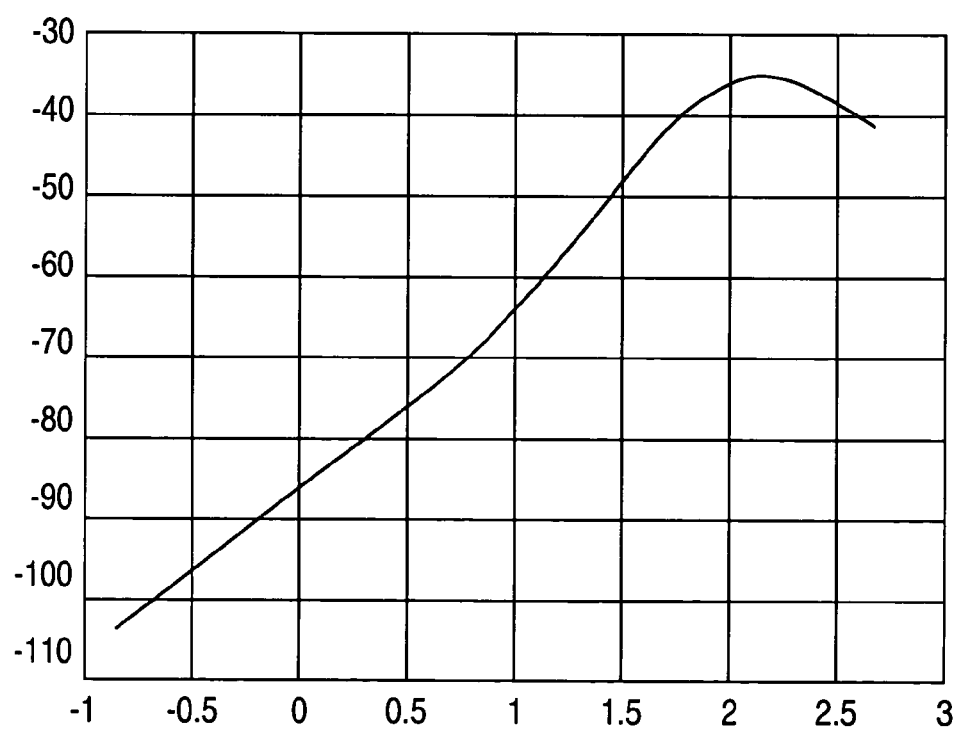
FIG. 7 is a graph that shows the values of the magnitude of the echo rejection of the analog echo canceller as a function of frequency.

As an illustrative example, FIG. 7 shows the values of the magnitude of the echo rejection of AEC 130 as a function of frequency for the following values: $f_0$ equals the frequency, R2 equals two thousand ohms (2000 $\Omega$), and fp equals $2\pi$ times 100 times $10^6$.

In FIG. 7 the ordinate of the graph is in units of $20 \log_{10}$ (absolute value of uncancelled echo). That is, the ordinate is $20 \log_{10}$ (|UNCANCELLED ECHO|). The ordinate values range from minus one hundred ten (−110) to minus thirty (−30). The abscissa of the graph is in units of $\log_{10}(f_0/10^6)$ and the value ranges from minus one (−1) to three (3) representing a frequency range of 100 kilohertz (100 kHz) to one Gigahertz (1 GHz). The graph in FIG. 7 shows that the uncancelled echo reaches a maximum value at a frequency equal to approximately one hundred fifty eight Megahertz (158.0 MHz) where $\log_{10}(f_0/10^6)$ equals approximately two (2.2).

AEC 130 provides high performance echo cancellation. In some types of full duplex transceivers such as the Gigabit Ethernet, AEC 130 has proven capable of providing from eighteen (18) to twenty (20) decibels (dB) of echo rejection.

AEC 130 provides such echo cancellation using only two (2) degrees of freedom in tuning. The first degree of freedom is that provided by the variable resistors, 320 and 340, and the second degree of freedom of tuning is provided by the variable capacitors, 350 and 360. The tuning of the resistors adjusts echo canceller current iECHOCANCEL to compensate for the direct current variations in the characteristic impedance of cable 105. The tuning of the capacitors adjusts the echo canceller current iECHOCANCEL to compensate for changes in the effective bandwidth of the echo path. The changes in the effective bandwidth of the echo path are due to variations in the impedance of transformer 110, variations in the capacitance of the electrostatic discharge protection capacitors, and variations in board capacitance.

The path of the echo current iECHO and the path of the echo canceller current iECHOCANCEL are the shortest possible paths. In addition, these paths do not contain any active elements. Mismatches in these two paths can lead to residual uncancelled echo. Mismatches in these two paths are minimized due to the absence of active elements in these paths. This configuration provides a very robust manufacturing design that is generally insensitive to process offsets.

Low pass filter 260 coupled to the output of line receiver 225 attenuates uncancelled high frequency echo. Uncancelled high frequency echo is usually due to the difference between the echo current iECHO and echo canceller current iECHOCANCEL that occur at high frequencies that is primarily caused by the z11 peaking of transformer 110 at the higher frequencies. Some of the uncancelled high frequency echo may be due to mismatches between the amplitudes of the echo current iECHO and echo canceller current iECHOCANCEL.

The signal from low pass filter 260 is a combination of the uncancelled echo and the receive signal. Low pass filter 260 output signal goes through the automatic gain control (AGC) circuit 135 which provides a flat gain. AGC circuit 135 maximizes the range of analog to digital converter (ADC) 145 that is usable without saturation. The signal then goes through the adaptive equalization filter 140. Adaptive equalization filter 140 provides partial equalization that reduces the peak to rms ratio of the incoming signal and reduces the effect of the quantization noise. At ADC 145, the signal is sampled using timing recovery controller 185 and clock recovery mixer 190 that is locked onto the receive signal. Therefore, the sampling is done with an arbitrary phase with respect to the residual uncancelled echo.

The signal then leaves ADC 145 and enters the digital domain. As shown in FIG. 1B, digital equalizer 151 completes equalization using a linear equalizer. Then the filtered and sampled residual uncancelled echo is cancelled in digital echo canceller 152. Then the near end cross talk (NEXT) (that has also been filtered and sampled in the same manner as the residual uncancelled echo) is cancelled with digital NEXT cancellers 153.

At this point, the signal is a fully equalized receive signal. The signal then needs to be scaled and have the baseline wander (BLW) removed. Digital automatic gain control (AGC) 154 then boosts the signal to the levels expected by slicer 158 and the forward error correction (FEC) circuit (not shown). Digital automatic gain control (AGC) 154 receives control signals from AGC adapter 155. Baseline wander (BLW) correction circuit 156 removes the base line wander from the signal. Baseline wander (BLW) correction circuit 156 receives control signals from baseline wander (BLW) adapter 157.

The receive signal has now been completely recovered and is ready to be sliced to obtain a temporary decision and error term. The recovered receive signal is also input to the forward error correction (FEC) circuit (not shown) for a final decision on the data. However, the temporary decision and error term of slicer 158 is used for the adaptation of most of the circuits in transceiver 100, including AEC 130. If digital echo canceller 152 were turned off, the error term from slicer 158 would be dominated by a filtered and sampled version of the residual uncancelled echo.

AEC 130 must be capable of acquiring an adapted value of resistor R4 in both a full-duplex mode and a simplex mode. The method of the present invention described below will first be described with respect to the more challenging case of the full-duplex mode. The method of the present invention will then be described with respect to the simpler case of the simplex mode.

Consider the problem of adapting variable resistor R4 in model circuit 290 in AEC 130 in the presence of a signal from the remote end transmitter. The remote end signal may be received over a cable that varies in length from zero meters (0 m) to over one hundred meters (100 m+). Under these circumstances the signal to echo ratio can vary dramatically. The signal to echo ratio varies because the amplitude of the incoming receive signal varies over the cable length.

The residual uncancelled echo can be used to adapt variable resistor R4 of model circuit 290 in AEC 130. When the resistor value R4 is too large, the gain through model circuit 290 is too small. Therefore, when a positive signal tx is transmitted, the echo canceller current signal at the output of model circuit 290 (i.e., iECHOCANCEL) is too small. When this signal is subtracted from the echo current signal (i.e., from iECHO), the residual uncancelled echo signal will be positive. For convenience, the quantity that represents the residual uncancelled echo will be designated by the letter "p". Similarly, when a negative signal is transmitted, the residual uncancelled echo is negative. In either of these cases, the correlation of the term p and the term tx (i.e., ptx) is positive. The symbol represents the mathematical operation of correlation.

The opposite situation occurs when the value of variable resistor R4 of model circuit 290 is too small. Then the gain through model circuit 290 is too large. A positive transmit signal tx results in a negative residual uncancelled echo, and a negative transmit signal tx results in a positive residual uncancelled echo. In either of these cases, the correlation of the term p and the term tx (i.e., ptx) is negative.

By correlating the transmit signals (tx) with the residual uncancelled echo (p), it is possible to determine whether the value of variable resistor R4 is too large or too small. The value of variable resistor R4 may be updated by using the expression:

$$R4(\text{new value}) = R4(\text{old value}) - \mu(p)(tx_k) \qquad (6)$$

where p is the residual uncancelled echo, $tx_k$ is the transmit signal at time k, and $\mu$ is a preselected constant scale factor for converting the result $(p)(tx_k)$ to a quantity expressed in ohms. A representative value of $\mu$ is 1.5 ohms/volt. The value of preselected constant scale factor $\mu$ controls the rate at which variable resistor R4 is adapted. Larger values of $\mu$ mean faster adaptation rates and smaller values of $\mu$ means slower adaptation rates.

In a full-duplex transceiver, the residual uncancelled echo signal cannot be seen after the signal has passed through AEC 130 because the residual uncancelled echo signal has the strong receive signal on top of it. Under such conditions it is not possible to accurately determine whether the residual uncancelled echo signal is positive or negative. In order to determine the value of the residual uncancelled echo, the receive signal must be recovered and subtracted from the signal that represents the sum of the remote end signal and the residual uncancelled echo signal.

In order to subtract the receive signal, it is necessary to wait until the receive end signal has gone through the transceiver front end and then look at the slicer error in slicer 158. It is possible to use the decision at slicer 158 to determine an estimate for the magnitude of the receive signal. As previously mentioned, if digital echo canceller 152 is not turned on (and therefore the residual uncancelled echo from AEC 130 is not cancelled), then the major source of error at slicer 158 will be the residual uncancelled echo.

Just as the receive signal has gone through the transceiver front end to be recovered, the residual uncancelled echo signal has also gone through the same transceiver front end. The error signal output by slicer 158 is the same as the residual uncancelled echo at the output of AEC 130, filtered by analog adaptive equalizer filter 140 and by digital equalizer 151, scaled by analog AGC 135 and by digital AGC 154, and sampled by ADC 145. Because of the filtering of the residual uncancelled echo before slicer 158, it is not possible to simply correlate the error at slicer 158 with the transmit signals to adapt variable resistor R4 of model circuit 290 of AEC 130.

Figure 8:
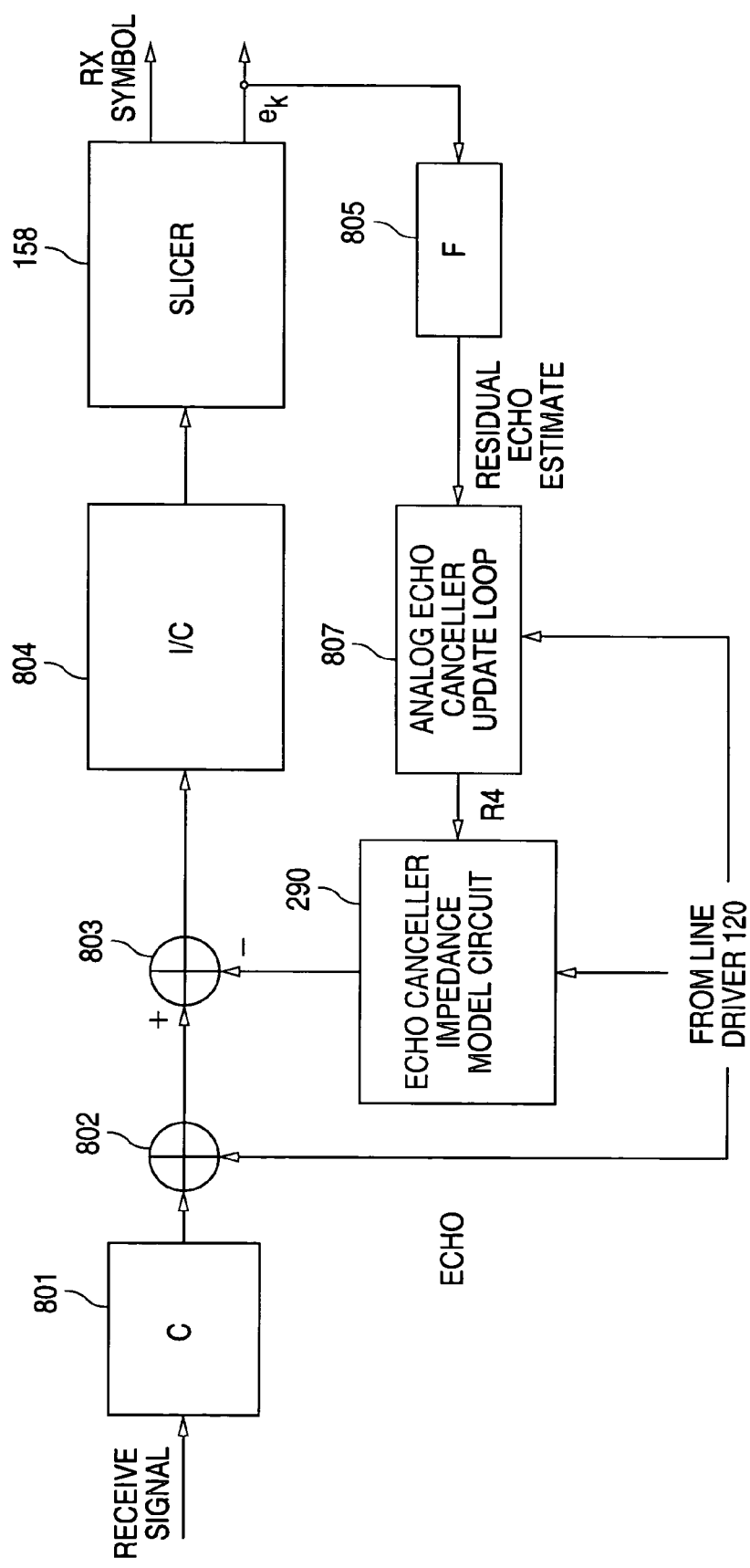
FIG. 8 illustrates a block diagram of the system and method of the present invention for adapting an analog echo canceller.

In order to overcome this problem, it is possible to use the knowledge of how the residual uncancelled echo is filtered to get the error at slicer 158. As shown in FIG. 8, it is possible to filter the error at slicer 158 with filter 805 to reverse the result of the equalization and gain in the system to recover a sampled version of the residual uncancelled echo.

If the channel response is represented by transfer function C, then the combined response of the equalization and gain in the system of FIG. 1B is represented by the transfer function 1/C. In FIG. 8 transfer function C is represented by block 801 and transfer function 1/C is represented by block 804. The application of filter 805 to the error signal reverses or undoes the combined response of the equalization and gain in the system of FIG. 1B.

This means that the response F of filter 805 will be given by:

$$F=1/(1/C)=C \quad (7)$$

That is, the response F of filter 805 is the same as the channel response C. Filtering the error signal by filter 805 provides a sampled version of the residual uncancelled echo. This value of the residual uncancelled echo can be correlated with the transmit signals to determine if the value of variable resistor R4 is too large or too small in the manner described above.

FIG. 8 illustrates a block diagram of the logic of the system and method of the present invention for adapting AEC 130. Receive signals pass through block 801 that represents channel response C and are combined in adder 802 with echo signals from the line driver 120. The sum of the signals are combined in adder 803 with echo canceller signals from model circuit 290. Block 290 is labeled "echo canceller impedance model circuit" and represents model circuit 290 within AEC 130.

The sum of the signals from adder 803 pass through block 804 that represents the combined response of the equalization and gain in the system (1/C). The signals then pass to slicer 158. Slicer 158 generates error signal $e_k$ which is input to filter 805. The error signal $e_k$ is filtered by filter 805 to provide an estimate of the residual uncancelled echo signal.

The estimate of the residual uncancelled echo signal is provided to block 807 entitled "analog echo canceller update loop" where a new value for variable resistor R4 is determined. Block 805 and block 807 are located within echo cancel control circuit 165 in FIG. 1A. The new value for variable resistor R4 is passed to model circuit 290 in AEC 130.

Because the automatic gain control (AGC) function of AGC 135 and AGC 154 simply scales the signal, the algorithm of filter 805 does not need to reverse the AGC response in order to provide a correct result.

Although all of the information necessary to determine the transfer function F is available, the process of calculating F can be very complicated and difficult to implement. Consider the Gigabit Ethernet as an example. Because it is known that the Gigabit Ethernet works on category 5 cabling from zero meters (0 m) to over one hundred meters (100 m+), the range of the channel response C is known. Therefore the response F of filter 805 is known (because F=C). It is possible to choose a simpler filter F' that approximates F well enough to achieve good adaptation. Therefore the signal that is correlated with the transmit signal is a sampled version of $(p*F'*1/C)_k$ where the symbol * represents the mathematical operation of convolution. Then the updating algorithm for variable resistor R4 is:

$$R4(\text{new value})=R4(\text{old value})-\mu(p*F'*1/C)_k \text{tx}_k \quad (8)$$

F' must be chosen so that for a positive transmit signal (1) if R4 is too large, then the sampled version of $(p*F'*1/C)$ is positive and (2) if R4 is too small, then the sampled version of $(p*F'*1/C)$ is negative. This relationship must hold over all C, and over all cable lengths from zero meters (0 m) to over one hundred meters (100 m+), and over all phases.

The ADC samples are based upon the phase of the receive signal. Therefore the receive signal is at an arbitrary phase to the transmit signal and to the residual uncancelled echo. The sampled values of $(p*F'*1/C)$ for negative transmit signals must have the inverse sign of the positive transmit signals mentioned above under all the conditions mentioned above. For the Gigabit Ethernet, an effective expression for F' is:

$$F'=1+2Z^{-1}+4Z^{-2}+8Z^{-3}+4Z^{-4}+2Z^{-5}+Z^{-6} \quad (9)$$

where Z represents the mathematical operation known as the Z transform. This expression for F' meets the above criteria set forth above.

Figure 9:
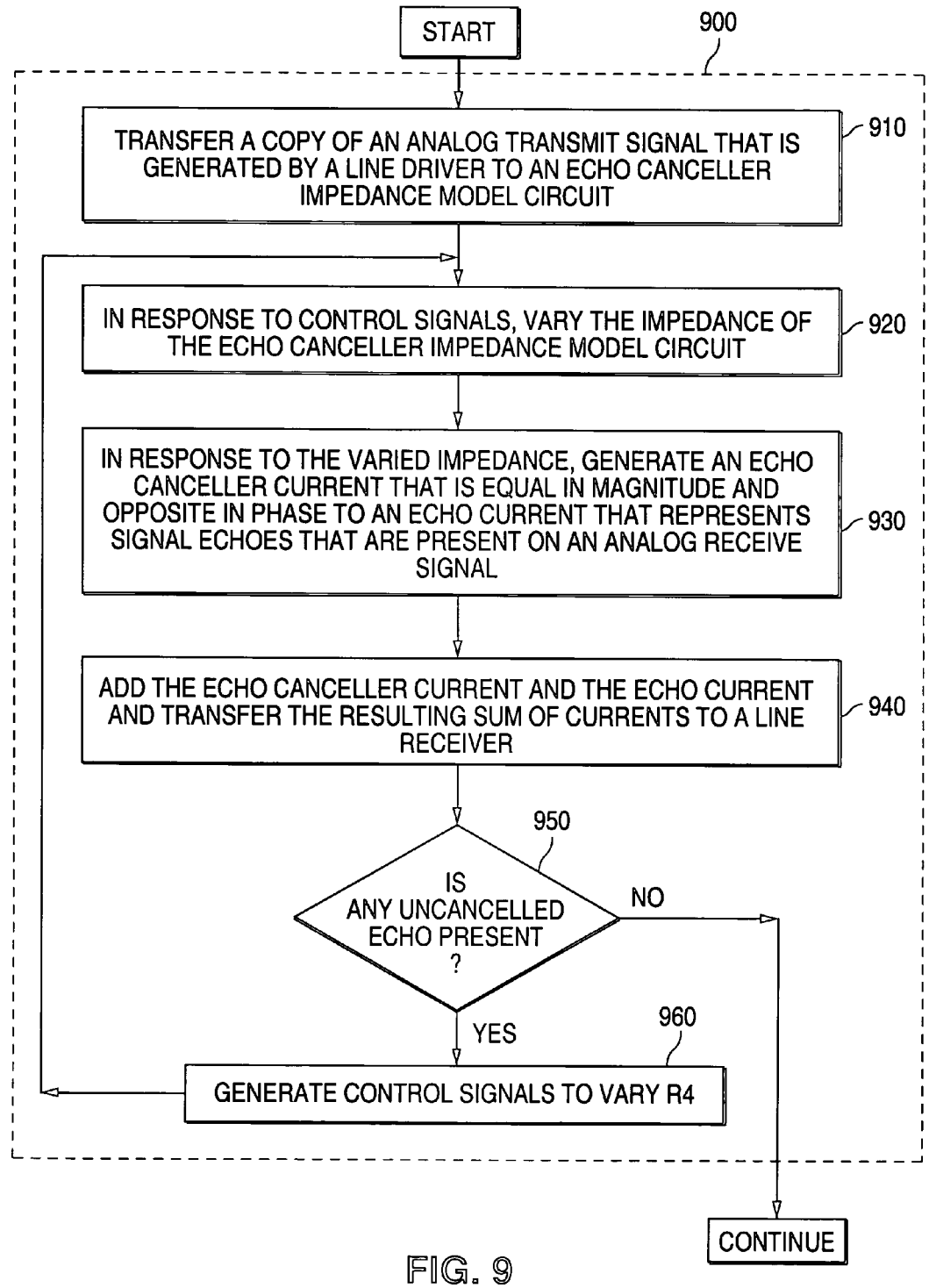
FIG. 9 is a flow diagram illustrating the operation of an exemplary full duplex transceiver according to one embodiment of the present invention for adapting a variable resistor in an analog echo canceller.

FIG. 9 depicts flow diagram 900, which illustrates the operation of exemplary full duplex transceiver 100 according to one embodiment of analog echo canceller 130 of the present invention. The operation steps of the method of the present invention are collectively referred to in FIG. 9 as operation steps 900. The first operation step 910 comprises transferring a copy of an analog transmit signal that is generated by line driver 120 to echo canceller impedance model circuit 290.

The second operation step 920 comprises varying the impedance of echo canceller impedance model circuit 290 in response to control signals from echo canceller control circuit 165. The third operation step 930 comprises generating an echo canceller current in response to the varied impedance of canceller impedance model circuit 290. The echo canceller current is equal in magnitude and opposite in phase to an echo current that represents signal echoes that are present on an analog receive signal.

The fourth operation step 940 comprises adding the echo canceller current and the echo current and transferring the resulting sum of the currents to line receiver 225. The fifth operation step 950 comprises the step of determining whether any uncancelled echo is present in the analog receive signal after the echo canceller current and the echo current have been summed.

If there is no uncancelled echo present, then the next step of the method is to continue. If there is uncancelled echo present, then the next step of the method is sixth operation step 960. Sixth operation step 960 generates control signals to vary the impedance of echo canceller impedance model circuit 290 to compensate for the uncancelled echo. Following this, the next step of the method is second operation step 920 that varies the impedance in response to the new control signals from operation step 960.

Figure 10:
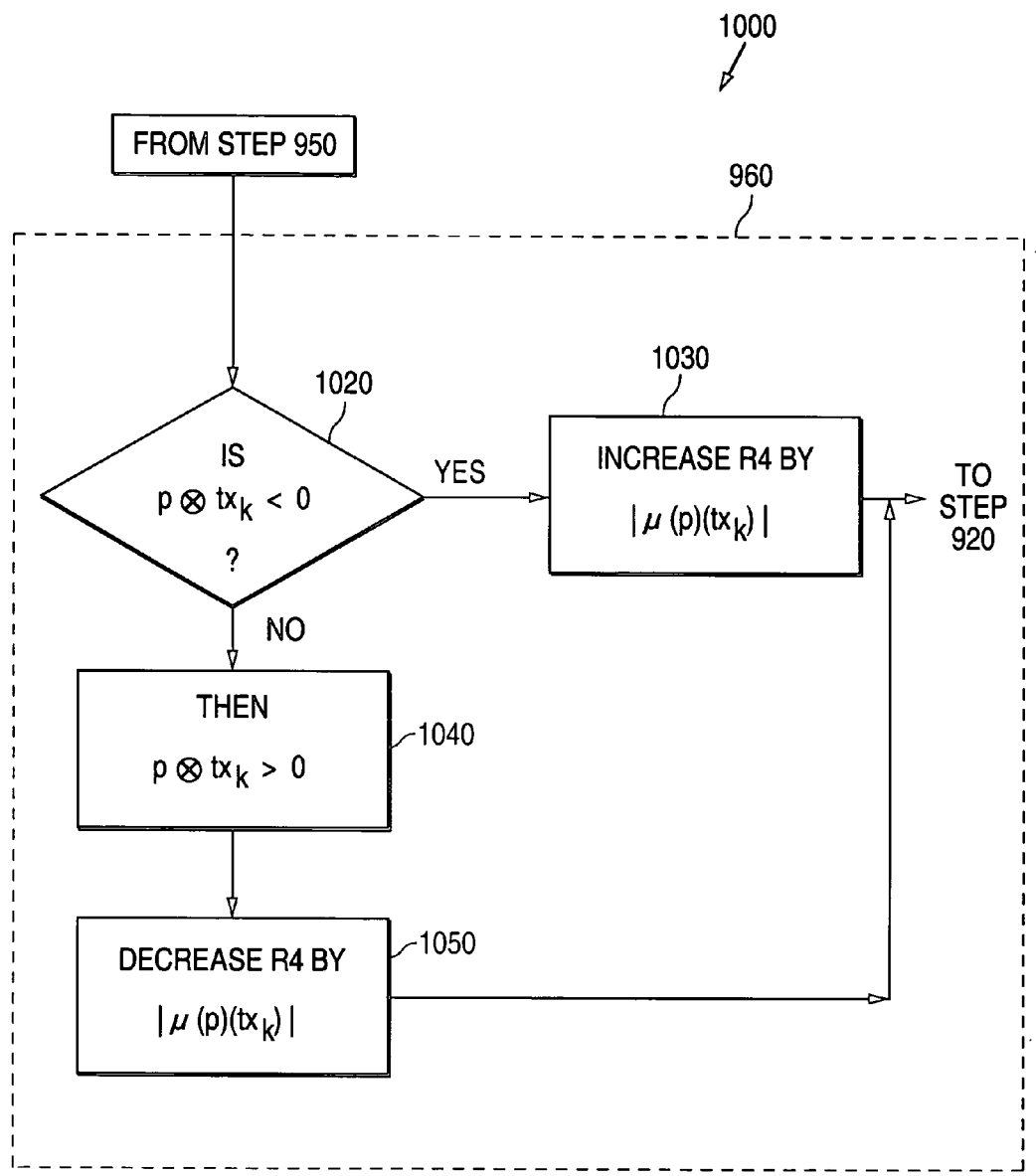
FIG. 10 is a flow diagram illustrating an operation step of the method of the present invention to generate control signals to adapt a variable resistor in an analog echo canceller.

The details of operation step 960 are shown in FIG. 10. The individual component steps of operation step 960 are collectively referred to in FIG. 10 as operation steps 1000. Decision step 1020 determines whether the quantity (p(txk) is negative. If (p(txk) is negative, then operation step 1030 increases the value of R4 by the absolute value of quantity $\mu$(p)(txk). Then the next operation step is second operation step 920.

If (ptx$_k$) is not negative, then (p(txk) is positive (as shown in block 1040). Then operation step 1050 decreases the value of R4 by the absolute value of the quantity $\mu$(p)(txk). Then the next operation step is second operation step 920.

This is the system and method for adapting an analog echo canceller in a full duplex transceiver front end. The system and method may easily be extended to cover the case of a simplex transceiver. In the case of a simplex transceiver there is no signal from the remote end. Therefore, the values for the analog AGC 135, and for the digital AGC 154, and for the analog adaptive equalization filter 140, and for the digital equalizer 151 may be set to any desired value. Therefore, it may be known in advance what the equalization and gain will be. This makes it possible to easily determine what value F (or F') filter 805 should have.

Because there is no signal from the remote end, then the sliced value should always be zero. Therefore, the slicer decision is always correct. This is in contrast to the full duplex case where the slicer decision can be incorrect. The fact that the slicer decision is always correct in the simplex case means that jitter will be reduced within the adaptation loop. With these minor changes, the system and method for adapting an analog echo canceller in the simplex case is the same as it is in the full duplex case.

Although the present invention has been described in detail, those skilled in the art should understand that they can make various changes, substitutions and alterations herein without departing from the spirit and scope of the invention in its broadest form.

What is claimed is:

1. For use in a transceiver of the type comprising a line driver capable of sending analog transmit signals through a cable, and a line receiver capable of receiving analog receive signals from said cable, and an analog echo canceller capable of cancelling echoes of said analog transmit signals that are present in said analog receive signals by generating an echo canceller current that is equal in magnitude and opposite in phase to a current that represents said signal echoes, a system for adapting said analog echo canceller comprising:

an analog echo canceller control circuit capable of changing a first value of the resistance of at least one variable resistor in said analog echo canceller by subtracting from said first value of resistance a second value of resistance equal to the product of the terms $\mu$, p, and tx, where p represents residual uncancelled echo at the output of said analog echo canceller, and where tx represents a transmit signal, and where $\mu$ represents a scale factor for converting the product of the term p and the term tx to a quantity expressed in ohms, when the correlation of the term p and the term tx is positive.

2. The system as claimed in claim 1 wherein said analog echo canceller control circuit is capable of changing a first value of the resistance of at least one variable resistor in said analog echo canceller by adding to said first value of resistance a second value of resistance equal to the product of the terms $\mu$, p, and tx, where p represents residual uncancelled echo at the output of said analog echo canceller, and where tx represents a transmit signal, and where $\mu$ represents a scale factor for converting the product of the term p and the term tx to a quantity expressed in ohms, when the correlation of the term p and the term tx is negative.

3. The system as claimed in claim 1 wherein said system is capable of determining the value of p, the residual uncancelled echo at the output of said analog echo canceller, from at least one error signal at the output of a slicer of said transceiver.

4. The system as claimed in claim 3 wherein said system is capable of determining the value of p by subtracting an estimate of the magnitude of a receive signal at the output of said slicer from a signal that represents the sum of said receive signal and said residual uncancelled echo signal at the output of said slicer, and by filtering said residual uncancelled echo signal at the output of said slicer to reverse equalization and gain applied to said residual uncancelled echo signal between said analog echo canceller and said slicer.

5. The system as claimed in claim 4 wherein said system is capable of filtering said residual uncancelled echo signal at the output of said slicer with a filter that represents the channel response of a channel between said transceiver and a remote end transceiver.

6. The system as claimed in claim 5 wherein said system is capable of transferring said filtered uncancelled echo signal to an echo canceller update loop in said analog echo canceller control circuit to determine a new value of resistance for said at least one variable resistor in said analog echo canceller.

7. The system as claimed in claim 5 wherein said analog echo canceller control circuit is capable of changing a first value of the resistance of at least one variable resistor in said analog echo canceller by subtracting from said first value of resistance a second value of resistance equal to the product of the terms $\mu$, (p*F'*1/C), and tx, where p represents residual uncancelled echo at the output of said analog echo canceller, and where C represents the channel response of said transceiver, and where F' represents the response of a filter applied to said residual uncancelled echo signal at the output of said slicer, and where F' represents a response that is approximately equal to the channel response C of said transceiver, and where the symbol * represents the mathematical operation of convolution, and where tx represents a transmit signal, and where $\mu$ represents a scale factor for converting the product of the term (p*F'*1/C) and the term tx to a quantity expressed in ohms, when the correlation of the term (p*F'*1/C) and the term tx is positive.

8. The system as claimed in claim 7 wherein said filter response F' equals the expression $$1+2Z^{-1}+4Z^{-2}+8Z^{-3}+4Z^{-4}+2Z^{-5}+Z^{-6}$$

where Z represents the mathematical operation known as the Z transform.

9. The system as claimed in claim 5 wherein said analog echo canceller control circuit is capable of changing a first value of the resistance of at least one variable resistor in said analog echo canceller by adding to said first value of resistance a second value of resistance equal to the product of the terms $\mu$, (p*F'*1/C), and tx, where p represents residual uncancelled echo at the output of said analog echo canceller, and where C represents the channel response of said transceiver, and where F' represents the response of a filter applied to said residual uncancelled echo signal at the output of said slicer, and where F' represents a response that is approximately equal to the channel response C of said transceiver, and where the symbol * represents the mathematical operation of convolution, and where tx represents a transmit signal, and where $\mu$ represents a scale factor for converting the product of the term (p*F'*1/C) and the term tx to a quantity expressed in ohms, when the correlation of the term (p*F'*1/C) and the term tx is negative.

10. The system as claimed in claim 9 wherein said filter response F' equals the expression $$1+2Z^{-1}+4Z^{-2}+8Z^{-3}+4Z^{-4}+2Z^{-5}+Z^{-6}$$

where Z represents the mathematical operation known as the Z transform.

11. A transceiver comprising:
   a line driver capable of sending analog transmit signals through a cable;
   a line receiver capable of receiving analog receive signals from said cable;
   an analog echo canceller capable of cancelling echoes of said analog transmit signals that are present in said analog receive signals by generating an echo canceller current that is equal in magnitude and opposite in phase to a current that represents said signal echoes; and
   an analog echo canceller control circuit capable of:
   changing a first value of the resistance of at least one variable resistor in said analog echo canceller by subtracting from said first value of resistance a second value of resistance equal to the product of the terms $\mu$, p, and tx, where p represents residual uncancelled echo at the output of said analog echo canceller, and where tx represents a transmit signal, and where $\mu$ represents a scale factor for converting the product of the term p and the term tx to a quantity expressed in ohms, when the correlation of the term p and the term tx is positive; and
   changing a first value of the resistance of at least one variable resistor in said analog echo canceller by adding to said first value of resistance a second value of resistance equal to the product of the terms $\mu$, p, and tx, where p represents residual uncancelled echo at the output of said analog echo canceller, and where tx represents a transmit signal, and where $\mu$ represents a scale factor for converting the product of the term p and the term tx to a quantity expressed in ohms, when the correlation of the term p and the term tx is negative.

12. The transceiver as claimed in claim 11 wherein said transceiver comprises a full duplex transceiver.

13. For use in a transceiver of the type comprising a line driver capable of sending analog transmit signals through a cable, and a line receiver capable of receiving analog receive signals from said cable, and an analog echo canceller capable of cancelling echoes of said analog transmit signals that are present in said analog receive signals by generating an echo canceller current that is equal in magnitude and opposite in phase to a current that represents said signal echoes, a method for adapting said analog echo canceller comprising the steps of:
   changing a first value of the resistance of at least one variable resistor in said analog echo canceller by subtracting from said first value of resistance a second value of resistance equal to the product of the terms $\mu$, p, and tx, where p represents residual uncancelled echo at the output of said analog echo canceller, and where tx represents a transmit signal, and where $\mu$ represents a scale factor for converting the product of the term p and the term tx to a quantity expressed in ohms, when the correlation of the term p and the term tx is positive.

14. The method as claimed in claim 13 further comprising the step of:
   changing a first value of the resistance of at least one variable resistor in said analog echo canceller by adding to said first value of resistance a second value of resistance equal to the product of the terms $\mu$, p, and tx, where p represents residual uncancelled echo at the output of said analog echo canceller, and where tx represents a transmit signal, and where $\mu$ represents a scale factor for converting the product of the term p and the term tx to a quantity expressed in ohms, when the correlation of the term p and the term tx is negative.

15. The method as claimed in claim 13 further comprising the step of:
   determining the value of p, the residual uncancelled echo at the output of said analog echo canceller, from at least one error signal at the output of a slicer of said transceiver.

16. The method as claimed in claim 15 wherein the step of determining the value of p, the residual uncancelled echo at the output of said analog echo canceller, from at least one error signal at the output of a slicer of said transceiver comprises the steps of:
   subtracting an estimate of the magnitude of a receive signal at the output of said slicer from a signal that represents the sum of said receive signal and said residual uncancelled echo signal at the output of said slicer; and
   filtering said residual uncancelled echo signal at the output of said slicer to reverse equalization and gain applied to said residual uncancelled echo signal between said analog echo canceller and said slicer.

17. The method as claimed in claim 16 wherein the step of filtering said residual uncancelled echo signal at the output of said slicer to reverse equalization and gain applied to said residual uncancelled echo signal between said analog echo canceller and said slicer comprises:
   filtering said residual uncancelled echo signal at the output of said slicer with a filter represents the channel response of a channel between said transceiver and a remote end transceiver.

18. The method as claimed in claim 17 further comprising the step of:
   transferring said filtered uncancelled echo signal to an echo canceller update loop in an analog echo canceller control circuit to determine a new value of resistance for said at least one variable resistor in said analog echo canceller.

19. The method as claimed in claim 17 further comprising the step of:
changing a first value of the resistance of at least one variable resistor in said analog echo canceller by subtracting from said first value of resistance a second value of resistance equal to the product of the terms $\mu$, ($p*F'*1/C$), and tx, where p represents residual uncancelled echo at the output of said analog echo canceller, and where C represents the channel response of said transceiver, and where F' represents the response of a filter applied to said residual uncancelled echo signal at the output of said slicer, and where F' represents a response that is approximately equal to the channel response C of said transceiver, and where the symbol * represents the mathematical operation of convolution, and where tx represents a transmit signal, and where $\mu$ represents a scale factor for converting the product of the term ($p*F'*1/C$) and the term tx to a quantity expressed in ohms, when the correlation of the term ($p*F'*1/C$) and the term tx is positive.

20. The method as claimed in claim 17 further comprising the step of:
changing a first value of the resistance of at least one variable resistor in said analog echo canceller by adding to said first value of resistance a second value of resistance equal to the product of the terms $\mu$, ($p*F'*1/C$), and tx, where p represents residual uncancelled echo at the output of said analog echo canceller, and where C represents the channel response of said transceiver, and where F' represents the response of a filter applied to said residual uncancelled echo signal at the output of said slicer, and where F' represents a response that is approximately equal to the channel response C of said transceiver, and where the symbol * represents the mathematical operation of convolution, and where tx represents a transmit signal, and where $\mu$ represents a scale factor for converting the product of the term ($p*F'*1/C$) and the term tx to a quantity expressed in ohms, when the correlation of the term ($p*F'*1/C$) and the term tx is negative.

* * * * *

UNITED STATES PATENT AND TRADEMARK OFFICE
CERTIFICATE OF CORRECTION

| | | |
|---|---|---|
| PATENT NO. | : 6,980,644 B1 | Page 1 of 1 |
| APPLICATION NO. | : 09/570078 | |
| DATED | : December 27, 2005 | |
| INVENTOR(S) | : Peter J. Sallaway, Thulasinath G. Manickam and Sreen Raghavan | |

It is certified that error appears in the above-identified patent and that said Letters Patent is hereby corrected as shown below:

Column 4, please delete "DETAILED DESCRIPTION OR THE INVENTION" and replace with -- DETAILED DESCRIPTION OF THE INVENTION--;

Column 12, line 45, delete "(i.e., ptx)" and place with -- (i.e. p $\otimes$ tx) --;

Column 12, line 46, insert -- $\otimes$ -- after the term "symbol";

Column 12, line 54, delete "(i.e., ptx)" and place with -- (i.e. p $\otimes$ tx) --;

Column 15, line 27, delete "(p(txk)" and replace with -- (p(tx$_k$) --;

Column 15, line 28, delete "(p(txk)" and replace with -- (p(tx$_k$) --;

Column 15, line 30, delete "μ(p)(txk)" and replace with -- μ(p)(tx$_k$) --;

Column 15, line 32, delete "(p(txk)" and replace with -- (p(tx$_k$) --; and

Column 15, line 34, delete "μ(p)(txk)" and replace with -- μ(p)(tx$_k$) --.

Signed and Sealed this

Seventeenth Day of October, 2006

JON W. DUDAS
*Director of the United States Patent and Trademark Office*